United States Patent
Underdal et al.

(10) Patent No.: US 7,958,407 B2
(45) Date of Patent: Jun. 7, 2011

(54) CONVERSION OF STATIC DIAGNOSTIC PROCEDURE TO DYNAMIC TEST PLAN METHOD AND APPARATUS

(75) Inventors: Olav M. Underdal, Kalamazoo, MI (US); Harry M. Gilbert, Portage, MI (US); Oleksiy Portyanko, Portage, MI (US); Randy L. Mayes, Otsego, MI (US); Gregory J. Fountain, Kalamazoo, MI (US); William W. Wittliff, III, Gobles, MI (US)

(73) Assignee: SPX Corporation, Charlotte, NC (US)

( * ) Notice: Subject to any disclaimer, the term of this patent is extended or adjusted under 35 U.S.C. 154(b) by 1058 days.

(21) Appl. No.: 11/478,320

(22) Filed: Jun. 30, 2006

(65) Prior Publication Data
US 2008/0005628 A1    Jan. 3, 2008

(51) Int. Cl.
G06F 11/00 (2006.01)
(52) U.S. Cl. .............................. 714/57; 714/26
(58) Field of Classification Search .................. 714/26
See application file for complete search history.

(56) References Cited

U.S. PATENT DOCUMENTS

| | | | |
|---|---|---|---|
| 4,964,125 A * | 10/1990 | Kim | 714/26 |
| 5,127,005 A * | 6/1992 | Oda et al. | 714/26 |
| 5,586,252 A * | 12/1996 | Barnard et al. | 714/48 |
| 5,631,831 A | 5/1997 | Bird et al. | |
| 6,205,465 B1 * | 3/2001 | Schoening et al. | 718/102 |
| 6,591,182 B1 * | 7/2003 | Cece et al. | 701/100 |
| 7,120,890 B2 * | 10/2006 | Urata et al. | 716/12 |
| 7,162,741 B2 * | 1/2007 | Eskin et al. | 726/25 |
| 7,165,216 B2 * | 1/2007 | Chidlovskii et al. | 715/237 |
| 2002/0112072 A1 * | 8/2002 | Jain | 709/239 |
| 2002/0116669 A1 * | 8/2002 | Jain | 714/43 |
| 2003/0028823 A1 | 2/2003 | Kallela et al. | |
| 2003/0177414 A1 * | 9/2003 | Pillutla et al. | 714/25 |
| 2004/0039844 A1 * | 2/2004 | Bonn | 709/245 |
| 2004/0044528 A1 * | 3/2004 | Chelba et al. | 704/249 |
| 2005/0071143 A1 * | 3/2005 | Tran et al. | 703/11 |
| 2005/0188267 A1 * | 8/2005 | Farchmin et al. | 714/35 |
| 2006/0074824 A1 * | 4/2006 | Li | 706/20 |
| 2006/0150018 A1 * | 7/2006 | Cousin et al. | 714/26 |
| 2007/0226540 A1 * | 9/2007 | Konieczny | 714/26 |

OTHER PUBLICATIONS

Tariq Assaf; Joanne Bechta Dugan, "Automatic Generation of Diagnostic Expert Systems From Fault Trees," 2003 Proceedings Annual Reliability and Maintainability Symposium, pp. 143-147. Yiannis Papadopoulos, David Parker and Christian Grante, "Automating the Failure Modes and Effects Analysis of Safety Critical Systems," Proceedings of the Eighth IEEE International Symposium on High Assurance Systems Engineering (HASE '04), Mar. 26, 2004, pp. 8339-8344.
U.S. Appl. No. 11/052,118, filed Feb. 8, 2005, Fountain, et al.
U.S. Appl. No. 11/452,250, filed Jun. 14, 2006, Underdal, et al.

* cited by examiner

*Primary Examiner* — Scott T Baderman
*Assistant Examiner* — Kamini Patel
(74) *Attorney, Agent, or Firm* — Baker & Hostetler (57) ABSTRACT

A diagnostic information converter reads an existing static diagnostic procedure in the form of a tree graph and generates a diagnostic Failure Modes and Effects Analysis that can be used in the generation of a dynamic diagnostic test plan. The converter identifies the end nodes of the graph and associates a specific failure mode with each of the end nodes. In addition, the converter traces a unique path from each end node along successive branches through one or more intermediate nodes to the root node, and from each of the paths derives an initial failure mode test including the test steps corresponding to the root node, the intermediate nodes and the end node. The converter further identifies and annotates precondition nodes that correspond to a vehicle state or condition, rather than to an actual diagnostic test step and allows a user to edit the initial failure mode tests.

21 Claims, 3 Drawing Sheets

CONVERSION OF STATIC DIAGNOSTIC PROCEDURE TO DYNAMIC TEST PLAN METHOD AND APPARATUS

FIELD OF THE INVENTION

The present invention relates generally to diagnostic equipment. More particularly, the present invention relates to the conversion or translation of a static diagnostic procedure, such as a tree-graph representation of a vehicle diagnostic test procedure, into a dynamic decision sequencing diagnostic test plan.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display, interactive diagnostics, multi-scope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

However, the diagnostic procedures can be based on diagnostic information that is organized or processed in one of a variety of different formats or methods. For example, in some systems a diagnostic procedure can be based on a static diagnostic fault tree. In this scenario, the diagnostic system may use intermediate results at each test step, or node of the fault tree, to determine which of one or more branches of the fault tree should be taken to the next node, or test step. In other systems, the diagnostic procedure can be based on a collection of elementary test procedures. In this scenario, the diagnostic system may use results of each in a series of the elementary test procedures to dynamically decide upon the sequence in which the elementary test procedures are to be performed.

However, in some cases, much of the diagnostic information used by two different types of systems can be common to both systems. Accordingly, it is desirable to provide a method and apparatus for converting or translating diagnostic information from one type of system into a format that can be executed on a second type of diagnostic system.

SUMMARY OF THE INVENTION

The foregoing needs are met, to a great extent, by the present invention, wherein in one aspect an apparatus and method are provided that in some embodiments provide for converting or translating diagnostic information for use with a diagnostic system from one type of organization or format that can be processed by one method into a second type of organization or format that can be processed by a second method.

In accordance with one aspect of the present invention, a computer-implemented method of converting a tree-graph representation of a diagnostic procedure into a dynamic decision sequencing representation based on a plurality of elementary diagnostic tests for use with a diagnostic plan generator can include reading a tree-graph that represents the diagnostic procedure and identifying an end node of the tree graph. The method can further include associating the end node with a failure mode, and tracing a path through one or more intermediate nodes to a root node.

In accordance with another aspect of the present invention, a computer program product for converting a tree-graph representation of a diagnostic procedure into a dynamic decision sequencing representation based on a plurality of elementary diagnostic tests for use with a diagnostic plan generator, including a computer-readable medium encoded with instructions configured to be executed by a processor in order to perform predetermined operations that include reading a tree-graph that represents the diagnostic procedure and identifying an end node of the tree graph. The predetermined operations can further include associating the end node with a failure mode, tracing a path through one or more intermediate nodes to a root node, and generating an initial failure mode test corresponding to the failure mode based on the path.

In accordance with yet another aspect of the present invention, a translator for converting a tree-graph representation of a diagnostic procedure into a dynamic decision sequencing representation based on a plurality of elementary diagnostic tests for use with a diagnostic plan generator can include a tree-graph reader configured to read a tree-graph that represents the diagnostic procedure, an end node identifier configured to identify an end node of the tree graph, and an associator configured to associate the end node with a failure mode. The translator can further include a path tracer configured to trace a path through one or more intermediate nodes to a root node, and a failure mode test generator configured to generate an initial failure mode test corresponding to the failure mode based on the path.

In accordance with still another aspect of the present invention, a translator for converting a tree-graph representation of a diagnostic procedure into a dynamic decision sequencing representation based on a plurality of elementary diagnostic tests for use with a diagnostic plan generator can include means for reading a tree-graph that represents the diagnostic procedure, means for identifying an end node of the tree graph, and means for associating the end node with a failure mode. The translator can further include means for tracing a path through one or more intermediate nodes to a root node, and means for generating an initial failure mode test corresponding to the failure mode based on the path.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment in accordance with the present invention provides a diagnostic information converter that can convert or translate diagnostic information for use with a diagnostic system from one type of organization or format that can be processed by one method into a second type of organization or format that can be processed by a second method. For example, diagnostic procedures for use with a diagnostic system can be based on diagnostic information that is organized or processed in one of a variety of different formats or methods. Thus, in some cases it can be useful to convert or translate a diagnostic procedure that is organized or processed in one format or method into a diagnostic test sequence that is organized or processed in a second format or method.

For example, in some systems a diagnostic procedure can be based on a static diagnostic fault tree. In this scenario, the diagnostic system may use intermediate results at each test step, or node of the fault tree, to determine which of one or more branches of the fault tree should be taken to the next node, or test step. An example of a diagnostic method for use with a vehicle diagnostic system of this type is disclosed in U.S. Pat. No. 5,631,831, entitled "Diagnosis Method For Vehicle Systems," to Bird, et al., dated May 20, 1997, the disclosure of which is hereby incorporated by reference in its entirety.

In other systems, the diagnostic procedure can be based on a collection of elementary test procedures. In this scenario, the diagnostic system may use results of each in a series of the elementary test procedures to dynamically decide upon the sequence in which the elementary test procedures are to be performed. An example of a method of generating a dynamic diagnostic test sequence for use with, for example, a PC-based vehicle diagnostic system to provide instructions for expert diagnostic procedures to allow a vehicle technician to identify the cause of a trouble code or vehicle operational problem at the component level is disclosed in a copending U.S. patent application, entitled "Dynamic Decision Sequencing Method and Apparatus," filed concurrently herewith by Fountain, et al., the disclosures of which is hereby incorporated by reference in its entirety.

Nevertheless, much of the diagnostic information used by two different types of systems can be common to both systems. For example, much of the diagnostic information in a diagnostic procedure based on a static diagnostic fault tree can be common to a related diagnostic test sequence based on a collection of elementary test procedures. Thus, as a specific example, an embodiment of the present invention can convert or translate a diagnostic procedure based on a static diagnostic fault tree into a diagnostic test sequence based on a collection of elementary test procedures, or failure mode tests. Examples of diagnostic procedures include troubleshooting of mechanical and electrical systems, medical diagnosis, and the like.

A representative embodiment provides a diagnostic information converter that can read a tree-graph representation of a vehicle diagnostic procedure, and identify the end nodes of the tree graph. Each of the end nodes can correspond, for example, to a conclusive or inconclusive test result. The diagnostic information converter can further associate each of the end nodes with a vehicle component failure mode. In addition, the diagnostic information converter can trace a path along branches connecting each of the end nodes by way of one or more intermediate nodes, or test steps, back to the root node of the tree graph, which can correspond, for example, to one or more vehicle onboard computer trouble codes or vehicle operational symptoms.

The test steps corresponding to the resulting path from the root node to each of the end nodes of the tree graph can be designated as an initial failure mode test corresponding to the failure mode associated with each of the end nodes. The diagnostic information converter can also employ pattern matching or reference matching methods to identify probable precondition nodes, that is, nodes that represent preliminary procedures or conditions required before the steps that constitute a failure mode test. Furthermore, the diagnostic information converter can permit a user, such as an expert vehicle technician, to further modify the initial failure mode tests in order to generate a finalized failure mode test.

The diagnostic information converter can assign probability factors and weighting factors, or the like, to the converted failure mode tests in order to develop a diagnostic Failure Mode and Effects Analysis (FMEA). The resulting diagnostic FMEA can be used to generate a dynamic diagnostic test sequence, for example, by a method disclosed in the copending U.S. patent application entitled, "Dynamic Decision Sequencing Method and Apparatus," referred to above. The method can dynamically construct an optimized decision sequence consisting of elementary tests to confirm the presence of a specific failure mode, while systematically maintaining, or tracking, necessary preconditions. The invention will now be described with reference to the drawing figures, in which like reference numerals refer to like parts throughout.

Figure 1:
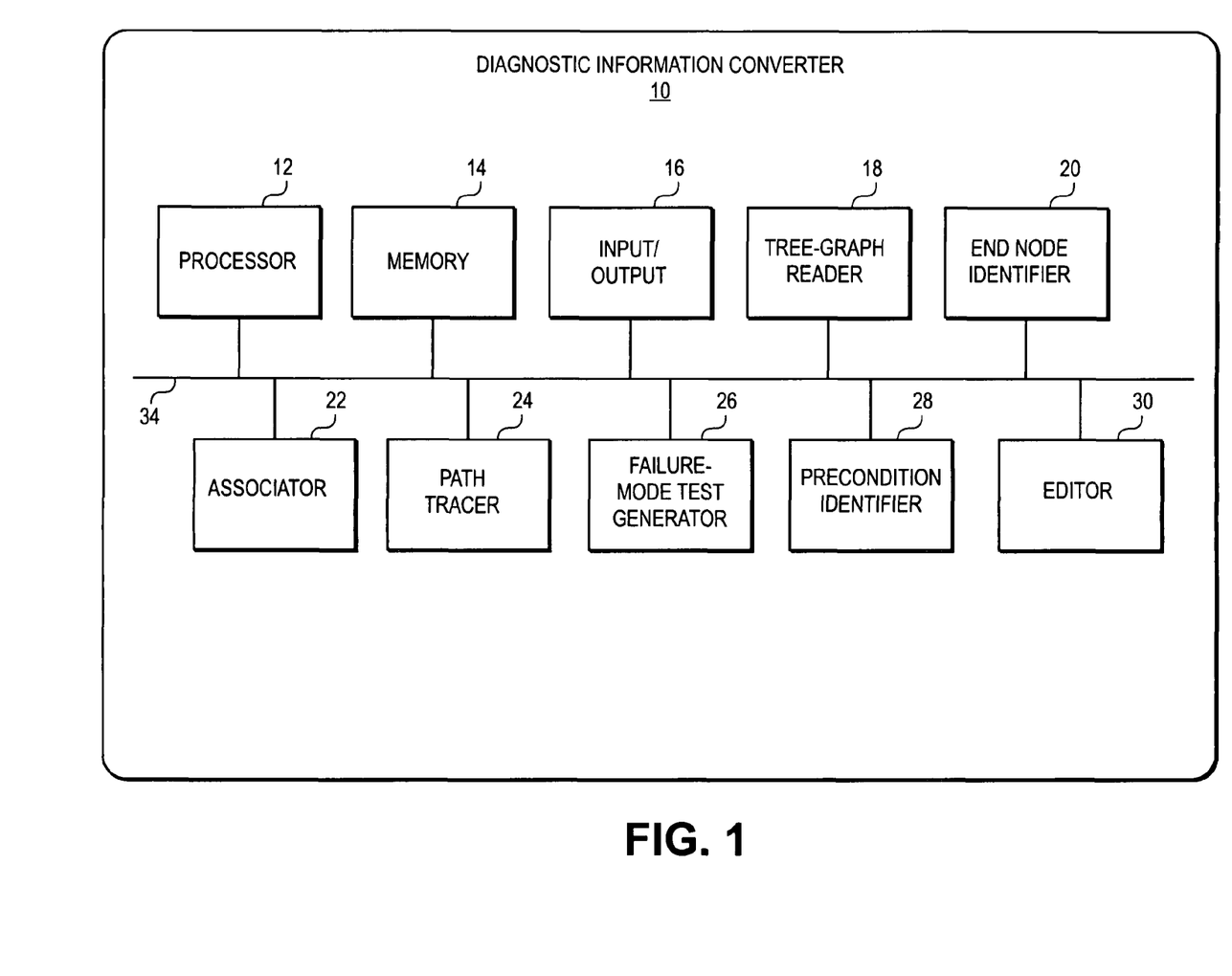
FIG. 1 is a schematic diagram illustrating a diagnostic information converter according to a embodiment of the invention.

FIG. 1 illustrates a diagnostic information converter 10 for use with, for example, a PC-based vehicle diagnostic system to provide instructions for expert diagnostic procedures to allow a vehicle technician to identify the cause of a trouble code or vehicle operational problem at the component level. An embodiment of the diagnostic information converter 10 can include a processor 12, a memory 14, an input/output device 16, a tree-graph reader 18, an end node identifier 20, an associator 22, a path tracer 24, a failure mode test generator 26, a precondition identifier 28, and an editor 30, all of which can be coupled by a data link 32.

The processor 12, the memory 14, and the input/output device 16 can be part of a general computing device, such as a personal computer (PC), a notebook, a UNIX workstation, a server, a mainframe computer, a personal digital assistant (PDA), or some combination of these. Alternatively, the processor 12, the memory 14 and the input/output device 16 can be part of a specialized computing device, such as a vehicle diagnostics scan tool. The remaining components can include programming code, such as source code, object code or executable code, stored on a computer-readable medium that can be loaded into the memory 14 and processed by the processor 12 in order to perform the desired functions of the diagnostic information converter 10.

In various embodiments, the diagnostic information converter 10 can be coupled to a communication network, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

An embodiment of the diagnostic information converter 10 can be coupled to the communication network by way of the local data link, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

An embodiment of the diagnostic information converter 10 can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

Figure 2:
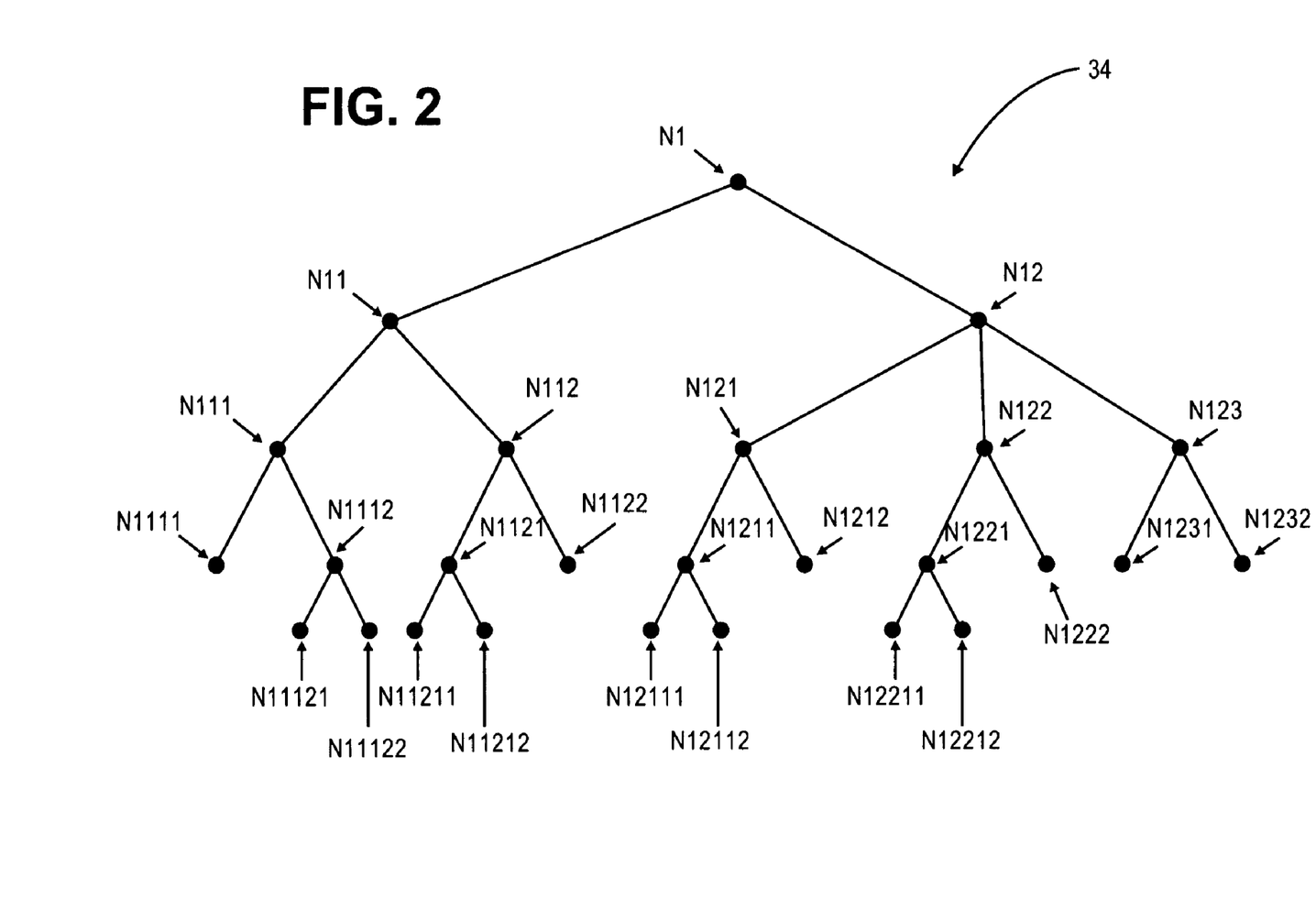
FIG. 2 illustrates a representative tree-graph representation of diagnostic information that can be converted by the diagnostic information converter.

The tree-graph reader 18 can import or interpret an existing static diagnostic procedure, for example, a diagnostic procedure in the form of a tree graph 34, such as the connected acyclic directed graph shown in FIG. 2. Viewing the graph of FIG. 2 as an abstraction of a diagnostic test procedure, each node of the graph can represent a diagnostic test step. Depending on the intermediate result obtained at a given node, the diagnostic test procedure may continue along one of multiple branches stemming from the node. The root node is a single node from which all the other nodes directly or indirectly stem.

Thus, for example, the root node N1 in FIG. 2 can represent an initial test step of a diagnostic procedure related to a symptom, such as a vehicle ECU trouble code or a generalized system failure symptom, or to a group of symptoms. As a specific example, the root node N1 may represent a first test step in diagnosing an "engine failure to start" condition, for example, "turn ignition key to START." In this case, node N11 may represent a "verify engine cranks" test step.

Continuing with this example, node N111 may represent a "check fuel supply" test step conditioned on the engine cranking, and node N112 may represent a "check starter motor supply voltage level" test step conditioned on the engine not cranking. Correspondingly, node N1121 may represent a "check battery voltage level" test step conditioned on the starter supply voltage level being unacceptably low, and node N1122 may represent a "replace starter motor" repair step conditioned on the starter supply voltage level being acceptable. Finally, node N11211 may represent a "replace battery" repair step conditioned on the battery voltage level being unacceptably low, and node N11212 may represent a "replace starter motor lead wire" repair step conditioned on the battery voltage level being acceptable.

The end node identifier 20 can search through the static diagnostic procedure and identify all of the end nodes, or terminal nodes, which are located at the far extreme of each unique path from the root node. In some embodiments, the end node identifier 20 can determine which of the end nodes provide a conclusive test result (i.e., a specific failure mode of a component) and identify only the conclusive end nodes. For example, in the tree graph 34 of FIG. 2, the end node identifier 20 can locate end nodes at the lower extreme of each unique path stemming from the root node N1:

| N1111  | N1122  | N12212 |
| N11121 | N12111 | N1222  |
| N11122 | N12112 | N1231  |
| N11211 | N1212  | N1232  |
| N11212 | N12211 |        |

The associator 22 can associate a failure mode with each end node. That is to say, the associator 22 can associate a specific type of failure, or failure mode, of a specific vehicle component with each of the end nodes identified. For example, in the specific example given above, the associator 22 may associate a battery core failure with end node N11121, and a starter motor lead wire continuity failure with end node N11122.

The path tracer 24 can trace, or identify, a path from each end node along successive branches through one or more intermediate nodes to the root node. For example, in the specific example given above, the path tracer 24 may trace a path from end node N11121 through intermediate nodes N1112, N111 and N11 to the root node N1. Equivalently, the path tracer 24 may trace a path from end node N11122 through intermediate paths N1112, N111 and N11 to the root node N1. In a like manner, the path tracer 24 may trace a unique path from each of the end nodes identified above in the tree graph 34 to the root node N1, resulting in a systematic isolation of all unique paths from the root node to the identified end nodes.

The failure mode test generator 26 can derive a unique initial failure mode test from each of the unique paths identified by the path tracer 24. The initial failure mode tests can begin with the test step corresponding to the root node, and include each of the test steps corresponding to the intermediate nodes along the individual paths, as well as the corresponding end nodes.

Each resulting initial failure mode test can be interpreted as a first estimate of an elementary diagnostic procedure intended to prove or disprove (conclusively or inconclusively) a hypothesis regarding the presence of a particular failure mode of a vehicle component. In other words, the set of initial failure mode tests can be related to the static diagnostic procedure, because, generally speaking, each initial failure mode test can correspond to a sequence of test steps in a decision tree from the root node to a bottom-level node, or end node.

For example, in the specific example given above, referring again to FIG. 2 as a tree graph representation of a static diagnostic procedure, a representative individual failure mode test could proceed along the top-to-bottom path, N1-N11-N112-N1121-N11211, and would include the following test steps in the following order:

- turn ignition key to START
- verify engine cranks
- if engine does not crank, check starter motor supply voltage level
- if the starter supply voltage level is unacceptably low, check battery voltage level
- if battery voltage level is unacceptably low, replace battery Likewise, the failure mode test generator 26 can derive a unique initial failure mode test based on each of the unique paths from the root node to each of the end nodes in the tree graph 34.

Furthermore, the failure mode test generator 26 can include in an initial failure mode test all of the "sibling" nodes that branch from the "parent" node of the end node. For example, in the specific example given above, the initial failure mode test could proceed along the path, N1-N11-N112-N1121-N11211-N11212, and would include the above test steps plus the additional repair step, "if the battery voltage level is acceptable, replace starter motor lead wire." Thus, the initial failure mode test can reach one of the following results: 1) a determination of a specific failure mode of the component corresponding to the parent node, 2) an inconclusive test result, or 3) conclusive proof that the component corresponding to the parent node is functioning correctly.

In some diagnostic procedures, certain of the test steps represent a vehicle state or condition that is required during the diagnostic procedure, or during a portion of the diagnostic procedure. Thus, the precondition identifier 28 can attempt to identify the test steps in the diagnostic procedure or in an initial failure mode test that correspond to a vehicle state or condition, rather than to an actual diagnostic test step. For example, in the specific example given above, the precondition identifier 28 can determine that the first step, "turn ignition key to START," is in actuality a vehicle state or condition required to perform the following test steps, "verify engine cranks" and "check starter motor supply voltage level."

In order to determine which, if any, of the test steps represent a vehicle state or condition, or precondition, the precondition identifier 28 can employ pattern-matching or reference matching methods known in the art. In this manner, the precondition identifier 28 can detect reuse of nodes that have previously been identified as preconditions (e.g., in another initial failure mode test, or during a previous conversion of another diagnostic procedure). The precondition identifier 28 can annotate any identified precondition nodes to mark or identify the node in the initial failure mode test as a precondition node.

In addition, the editor 30 can receive user inputs, for example, by way of the input/output device 16, and modify the initial failure mode tests. For example, in some embodiments, the editor 30 can add additional nodes, such as additional precondition nodes, test step nodes or repair step nodes.

In some embodiments, the editor 30 can also annotate additional nodes in the initial failure mode tests as precondition nodes, for example, precondition nodes that were not identified by the precondition identifier 28. Similarly, in some embodiments, the editor 30 can annotate or further annotate failure mode test steps or repair steps. Moreover, in some embodiments, the editor 30 can annotate nodes that are obsolete or not applicable (e.g., nodes that correspond to preconditions for another failure mode test), for example, to mark these nodes for deletion.

Furthermore, the editor 30 can allow the user, for example, an experienced diagnostics technician, to add initial values for factors that can be used during subsequent generation of a dynamic diagnostic test sequence based on the converted failure mode tests. The factors can include, for example, an estimated difficulty level, time, or cost required to perform a procedure or repair, statistical probability information based on historical diagnostic results, such as a risk or probability of the occurrence of the failure mode, effects associated with a failure mode, a severity of a failure mode, or the like. Likewise, the factors can include, for example, estimated probability information based on engineering analysis or statistical probability estimates based on empirical data from actual failures. Thus, the diagnostic information converter can create a diagnostic Failure Mode and Effects Analysis (FMEA) by way of a semi-automated, user interactive process.

Moreover, the editor 30 can allow the user to associate with each node relevant information and documents pertaining to the particular component, as well as connected or otherwise related components. For example, relevant service information can be associated with nodes, such as information from technical or medical manuals, technical drawings, wiring schematics, anatomical diagrams, pictures, component and failure mode explanations, databases, and the like, to which a diagnostics technician can refer while being guided through a generated dynamic diagnostic test sequence.

In some embodiments, the editor 30 can implement high-usability tools to quickly mark the precondition and test nodes, for example, using common mouse-click and drag operations, or the like. These features can significantly improve the efficiency of the conversion process, especially after a substantial database of node annotations has been developed.

Thus, the diagnostic information converter 10 can generate a diagnostic FMEA that can be used to generate a dynamic diagnostic test plan to diagnose a failure mode of a vehicle based on one or more symptoms. For example, a dynamic diagnostic test plan based on the diagnostic FMEA can be generated by a method disclosed in the copending U.S. patent application entitled, "Dynamic Decision Sequencing Method and Apparatus," referred to above. The method disclosed in this copending application can dynamically construct an optimized decision sequence consisting of elementary failure mode tests to confirm the presence of a specific failure mode, while systematically maintaining, or tracking, necessary preconditions.

Figure 3:
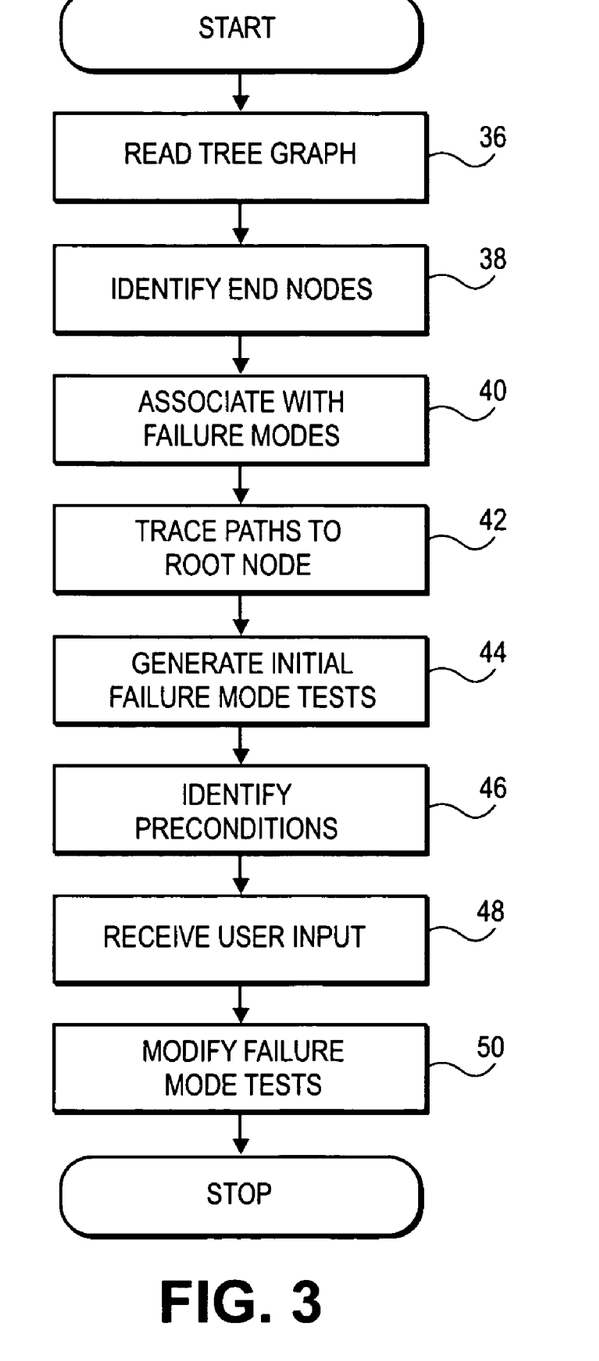
FIG. 3 is a flowchart illustrating steps that may be followed in accordance with one embodiment of the method or process of converting diagnostic information for use with a diagnostic system.

FIG. 3 is a flowchart illustrating a sequence of steps that can be performed in order to convert or translate a diagnostic procedure based on a static diagnostic fault tree into a diagnostic test sequence based on a collection of elementary test procedures, or failure mode tests. The process can begin by proceeding to step 36, "Read Tree Graph," in which an existing static diagnostic procedure, for example, in the form of a tree graph, or a connected acyclic directed graph, can be imported or interpreted, as described above. Then, in step 38, "Identify End Nodes," one or more end nodes, or terminal nodes, of the tree graph can be identified, as discussed above.

In some embodiments, all of the end nodes of a tree graph can be identified. In some alternative embodiments, only those end nodes that provide a conclusive test result can be identified.

Next, in step 40, "Associate with Failure Modes," a specific failure mode can be associated with the respective end nodes, as explained above. Then, in step 42, "Trace Paths to Root Node," a unique path can be traced from each of the identified end nodes along successive branches through one or more intermediate nodes to a root node, as explained above, resulting in a systematic isolation of all unique paths from the root node to the identified end nodes.

Subsequently, in step 44, "Generate Initial Failure Mode Tests," a unique initial failure mode test can be derived from each of the traced unique paths, as described above. The initial failure mode tests can begin with the test step corresponding to the root node, and include each of the test steps corresponding to the intermediate nodes along the individual paths, as well as the test steps corresponding to the end nodes.

In addition, in step 46, "Identify Preconditions," test steps in the diagnostic procedure or in an initial failure mode test that correspond to a vehicle state or condition, rather than to an actual diagnostic test step can be identified and annotated, as discussed above. For example, precondition nodes can be determined using pattern-matching or reference matching methods known in the art.

Then, in step 48, "Receive User Input," user inputs can be received, for example, by way of an input/output device. Correspondingly, in step 50, "Modify Failure Mode Tests," the initial failure mode tests can be modified, or edited, in accordance with the user input, as explained above. For example, additional nodes, such as additional precondition nodes, test step nodes or repair step nodes, can be added to the initial failure mode tests. In addition, precondition nodes or test step nodes can be annotated, for example, to identify precondition nodes that were not previously identified, or to mark an obsolete node or a node that is not applicable to the failure mode test for deletion.

Thus, the method outlined in the flowchart of FIG. 3 can generate a diagnostic FMEA that can be used in the subsequent generation of a dynamic diagnostic test plan to diagnose a failure mode of a vehicle based on one or more symptoms. For example, a dynamic diagnostic test plan based on the diagnostic FMEA can be generated by a method disclosed in the copending U.S. patent application entitled, "Dynamic Decision Sequencing Method and Apparatus," referred to above.

FIGS. 1 and 3 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the apparatus of one embodiment including several of the key components of a general-purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general-purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices 16, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touchscreen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of converting a tree-graph representation of a diagnostic procedure into a dynamic decision sequencing representation based on a plurality of elementary diagnostic tests for use with a diagnostic plan generator, the method comprising:
   reading the tree-graph that represents the diagnostic procedure;
   identifying an end node of the tree-graph;
   associating the end node with a failure mode;
   tracing a path through one or more intermediate nodes of the tree-graph to a root node of the tree-graph; and
   generating an initial failure mode test corresponding to the failure mode based on the path traced through the tree-graph.

2. The computer-implemented method of claim 1, further comprising identifying at least one of the intermediate nodes as a first precondition node.

3. The computer-implemented method of claim 2, further comprising employing at least one matching method selected from a pattern matching method and a reference matching method to identify the first precondition node based on at least one corresponding node having been previously identified as a second precondition node.

4. The computer-implemented method of claim 1, wherein the end node and the one or more intermediate nodes and the root node are sequentially connected by a plurality of branches.

5. The computer-implemented method of claim 1, further comprising:
   receiving a user input; and
   modifying the initial failure mode test based on the user input.

6. The computer-implemented method of claim 5, wherein the user input is received through direct manipulation of displayed graphical representations of objects and symbols by way of an input device.

7. The computer-implemented method of claim 5, wherein the step of modifying comprises at least one selected from the following:
   annotating one of the intermediate nodes that corresponds to a first precondition, annotating one of the intermediate nodes that corresponds to a first test step, deleting one of the intermediate nodes that corresponds to a second precondition, and deleting one of the intermediate nodes that corresponds to a second test step.

8. The computer-implemented method of claim 1, further comprising:
   identifying all of one or more additional end nodes of the tree-graph;
   associating each of the additional end nodes with an additional failure mode; and
   tracing a unique path through one or more additional intermediate nodes from each of the one or more additional end nodes to the root node.

9. The computer-implemented method of claim 8, wherein each of the additional end nodes and the one or more additional intermediate nodes and the root node are sequentially connected by a plurality of branches.

10. A computer program product for converting a tree-graph representation of a diagnostic procedure into a dynamic decision sequencing representation based on a plurality of elementary diagnostic tests for use with a diagnostic plan generator, including a computer-readable medium encoded with instructions configured to be executed by a processor in order to perform predetermined operations comprising:
    reading the tree-graph that represents the diagnostic procedure;
    identifying an end node of the tree-graph;
    associating the end node with a failure mode;
    tracing a path through one or more intermediate nodes of the tree-graph to a root node of the tree-graph; and
    generating an initial failure mode test corresponding to the failure mode based on the path traced through the tree-graph.

11. The computer program product of claim 10, wherein the predetermined operations further comprise identifying at least one of the intermediate nodes as a first precondition node by way of at least one matching method selected from a pattern matching method and a reference matching method based on at least one corresponding node having been previously identified as a second precondition node.

12. The computer program product of claim 10, wherein the predetermined operations further comprise:
    receiving a user input; and
    modifying the initial failure mode test based on the user input.

13. The computer program product of claim 10, wherein the predetermined operations further comprise:
    identifying all of one or more additional end nodes of the tree-graph;
    associating each of the additional end nodes with an additional failure mode; and
    tracing a unique path through one or more additional intermediate nodes from each of the one or more additional end nodes to the root node.

14. A translator, implemented on a computing device, for converting a tree-graph representation of a diagnostic procedure into a dynamic decision sequencing representation based on a plurality of elementary diagnostic tests for use with a diagnostic plan generator, comprising:
    a tree-graph reader configured to read a tree-graph that represents the diagnostic procedure when processed by a processor;
    an end node identifier configured to identify an end node of the tree-graph;
    an associator configured to associate the end node with a failure mode;
    a path tracer configured to trace a path through one or more intermediate nodes of the tree-graph to a root node of the tree-graph; and
    a failure mode test generator configured to generate an initial failure mode test corresponding to the failure mode based on the path traced through the tree-graph.

15. The translator of claim 14, further comprising a precondition identifier configured to identify at least one of the intermediate nodes as a first precondition node by way of at least one matching method selected from a pattern matching method and a reference matching method based on at least one corresponding node having been previously identified as a second precondition node.

16. The translator of claim 14, further comprising:
a receiver configured to receive a user input; and
a failure mode test modifier configured to modify the initial failure mode test based on the user input.

17. The translator of claim 14, wherein the end node identifier is further configured to identify all of one or more additional end nodes of the tree-graph, the associator is further configured to associate each of the additional end nodes with an additional failure mode, and the path tracer is further configured to trace a unique path through one or more additional intermediate nodes from each of the one or more additional end nodes to the root node.

18. A translator, implemented on a computing device, for converting a tree-graph representation of a diagnostic procedure into a dynamic decision sequencing representation based on a plurality of elementary diagnostic tests for use with a computer implemented diagnostic plan generator, comprising:
means for reading the tree-graph that represents the diagnostic procedure;
means for identifying an end node of the tree-graph;
means for associating the end node with a failure mode;
means for tracing a path through one or more intermediate nodes of the tree-graph to a root node of the tree-graph; and
means for generating an initial failure mode test corresponding to the failure mode based on the path traced through the tree-graph.

19. The translator of claim 18, further comprising means for identifying at least one of the intermediate nodes as a first precondition node by way of at least one matching method selected from a pattern matching method and a reference matching method based on at least one corresponding node having been previously identified as a second precondition node.

20. The translator of claim 18, further comprising:
means for receiving a user input; and
means for modifying the initial failure mode test based on the user input.

21. The translator of claim 18, further comprising:
means for identifying all of one or more additional end nodes of the tree-graph;
means for associating each of the additional end nodes with an additional failure mode; and
means for tracing a unique path through one or more additional intermediate nodes from each of the one or more additional end nodes to the root node.

* * * * *